United States Patent [19]
Stover

[11] 3,739,284
[45] June 12, 1973

[54] VOR RECEIVER IMMUNE TO FALSE BEARING INDICATION STEMMING FROM ADJACENT CHANNEL MODULATION COMPONENTS

[75] Inventor: Harris A. Stover, Cedar Rapids, Iowa

[73] Assignee: Collins Radio Company, Cedar Rapids, Iowa

[22] Filed: Oct. 14, 1971

[21] Appl. No.: 189,417

[52] U.S. Cl. .............................. 325/468, 343/106 R
[51] Int. Cl. .............................. H04b 1/20, G01s 1/50
[58] Field of Search .................. 343/106 R, 106 D; 325/473, 477, 489, 458, 61, 468, 470

[56] References Cited

UNITED STATES PATENTS

| | | | |
|---|---|---|---|
| 3,680,118 | 7/1972 | Anthony | 343/106 R |
| 3,665,470 | 5/1972 | Hemme | 343/106 R |

*Primary Examiner*—Benjamin A. Borchelt
*Assistant Examiner*—A. M. Psitos
*Attorney*—Richard W. Anderson and Robert J. Crawford

[57] ABSTRACT

An improved variable omnirange (VOR) receiver is described. Troublesome FM to AM conversion in the receiver selectivity defining IF bandpass filter of adjacent channel 9960 Hz subcarrier modulation components, which combine with the normal 30 Hz carrier amplitude modulation component and destroy the true phase thereof, is prevented from developing false VOR bearing indications by the inclusion of a further narrow band IF bandpass filter through which the IF signal is separately passed to an additional AM detector to develop the true 30 Hz AM component. The 30 Hz subcarrier FM component is demodulated in the normal manner. The reference and variable phase 30 Hz modulation components then exhibit a relative phase which is truly indicative of VOR bearing.

9 Claims, 2 Drawing Figures

VOR RECEIVER IMMUNE TO FALSE BEARING INDICATION STEMMING FROM ADJACENT CHANNEL MODULATION COMPONENTS

This invention relates generally to navigation receivers and more particularly to an improved variable omnirange (VOR) receiver.

The VOR navigation system currently in use employs a cardioid pattern rotating 30 times per second which produces a variable phase 30 Hz amplitude modulation of the signal arriving at the receiver. A 30 Hz reference signal is also transmitted as 30 Hz frequency modulation of a 9960 Hz AM subcarrier with a deviation of ±480 Hz. The airborne VOR receiver reads bearing by comparing the phase between these two 30 Hz modulations.

In another compatible system currently in use, known as Doppler VOR, the 30 Hz AM modulation is fixed and does not vary with direction, but the phase of the 30 Hz FM modulation of the 9960 Hz subcarrier becomes a function of the direction from the ground station.

These two currently employed systems are considered compatible because the same receiver may be used with both systems, since bearing determination circuitry employed in the receivers operates on the basis of relative phase comparison between the two 30 Hz signals.

The currently employed VOR transmitting stations are each assigned one of a plurality of channel allocations which are spaced 100 kHz apart in frequency. Future planning, however, calls for reduced spacing between adjacent channels of only 50 kHz. Reduction of the channel spacing to 50 kHz may give rise to a potential problem. To illustrate this potential problem, one might consider that approximately 10.5 kHz is required on either side of the carrier for the sidebands of the 9960 Hz subcarrier and its modulation sidebands. With the further assumption that the frequency tolerances of the ground station and the receiver may add another 7.5 kHz or greater requirement on either side of the required frequency, a total of 18 kHz or more is required on either side of the center frequency. In order to avoid having useful information sidebands from a given ground station transmission fall near the corner frequencies of the receiver bandwidth determining filter, the total receiver bandwidth begins to approach the 50 kHz channel spacing. Thus, the sidebands of an adjacent channel may extend onto the skirts of the filter which provides the receiver selectivity.

If there is a sufficient signal within the desired channel, no problem will exist because the desired channel will be sufficiently stronger than the adjacent channel signal that the adjacent channel signal cannot cause a problem. However, under the particular circumstances where there is no signal at all or a relatively weak signal in a selected channel, and a relatively strong signal in the adjacent channel (a condition which can give rise by erroneously selecting the wrong channel), the VOR receivers currently in use may give an erroneous direction indication.

The erroneous bearing indication suggested above occurs as a result of FM to AM conversion of one of the modulation sidebands of the 9960 Hz subcarrier modulation. This FM to AM conversion results from slope detection on the skirt of the intermediate frequency bandpass filter which provides the receiver selectivity.

The 30 Hz AM modulation which results from the FM to AM conversion will have its phase determined by the phase of the FM modulation. When this converted 30 Hz AM modulation is added to the normal 30 Hz AM modulation, it may result in an entirely new phase relationship depending upon the relative amplitudes and phases of the two sources of 30 Hz AM modulation. For example, in some receivers which employ IF bandpass filters with very steep sides on the selectivity curves, mistuning of this signal to an unoccupied adjacent channel will cause a 9,960 Hz modulation sideband of the received signal to fall on the side of the IF selectivity curve. Frequency modulation of this 9,960 Hz sideband at a 30 Hz rate causes it to move up and down the side of the selectivity curve, resulting in frequency modulation to amplitude modulation conversion. The resulting amplitude modulation occurring from this slope detection, when added to the original or normal modulation, can result in a 30 Hz amplitude modulation of the wrong phase and hence an erroneous direction indication.

Recognizing the problem and its cause as described above, means have been employed in the art to monitor the existence of certain modulation components occurring within VOR receivers and to activate an alarm indicator or flag to indicate the detection of a situation which could give rise to erroneous bearing indication. Monitoring systems of this type are described in co-pending application Ser. No. 61,954 by William R. Hemme, filed Aug. 7, 1970, now U.S. Pat. No. 3,655,470, entitled "VOR Adjacent Channel Sensor" and assigned to the assignee of the present invention. Further monitoring systems by means of which the existence of conditions which may give rise to erroneous bearing indications are found in my co-pending application Ser. No. 175,113 filed Aug. 26, 1971, entitled "Detector of False VOR Direction Indication" and Ser. No. 175,262 filed Aug. 26, 1971, entitled "False VOR Bearing Indication Monitor," each assigned to the assignee of the present invention.

While the above-referenced co-pending applications define means for annunciating the false VOR bearing situation by providing means of detecting the presence of the potential problem, the equipment obviously cannot be used when the problem exists and a considered better approach would be the provision of a receiver to correctly indicate the signal direction from whatever channel to which it is tuned and to provide no indication at all when it is not tuned to a channel which has an active signal. That is, a receiver with immunity to the false VOR bearing indication problem is considered to be a more satisfactory solution than a receiver provided with annunciation means to indicate that the problem exists. Toward this end, my co-pending application Ser. No. 182,341 filed Sept. 21, 1971, entitled "VOR Reciever" and assigned to the assignee of the present invention, outlines a new VOR receiver approach employing synchronous detection and new filter techniques by means of which the VOR receiver exhibits immunity to the problem of false VOR bearing determination due to adjacent channel modulation components and/or receiver mistuning.

Recognizing that modification of existing VOR receivers to render them immune to the above-defined problems may be more economically expedient than a receiver redesigned to incorporate synchronous detection, the object of the present invention is the provision of a simple modification means for an existing VOR receiver by means of which immunity to the above-defined problem may be realized by a minimal circuitry addition to current VOR receiver embodiments.

The present invention accordingly has as a primary object thereof the provision of modification means for a standard VOR receiver by means of which the receiver may be rendered immune to the problem of false VOR bearing indication stemming from adjacent channel modulation components falling in the receiver passband receiver mistuning, or the presence of a strong signal in an adjacent channel when the receiver is tuned to a channel with a relatively weak signal.

The present invention is featured in the addition of a further bandpass filter and amplitude detector in circuit with a conventional VOR receiver so as to prevent the 30 Hz AM modulation resulting from FM to AM conversion in the receiver IF bandpass filter from combining with the original or normal 30 Hz AM modulation.

These and other features and objects of the present invention will become apparent upon reading the following description with reference to the accompanying drawings in which.

The above-defined false VOR bearing indication problem may be summarized as stemming from the development of a 30 Hz AM modulation signal resulting from FM to AM conversion when the 9960 Hz subcarrier from an adjacent channel falls on the slope or skirt of the receiver selectivity determining bandpass filter. The 30 Hz signal resulting from the FM to AM conversion combines with the original or normal 30 Hz AM modulation signal to provide a 30 Hz modulation component for subsequent phase comparison to determine direction the phase of which is not that defined by the location of the receiver with respect to the ground transmitting station but rather is that defined phase modified randomly by the combination of the normal 30 Hz AM modulation component with the component resulting from FM to AM conversion. The phase reference is thereby lost and the receiver, in making a relative phase comparison in the direction determining and readout circuitry, provides an erroneous bearing indication.

In accordance with the present invention the erroneous direction indication is prevented by means keeping the 30 Hz AM modulation resulting from FM to AM conversion from combining with the original or normal 30 Hz AM modulation signal. With the normal 30 Hz AM modulation signal kept separate from the 30 Hz AM modulation resulting from FM to AM conversion, only the normal 30 Hz AM modulation component is employed for phase comparison with the 30 Hz FM modulation of the 9960 Hz subcarrier, and the problem of false bearing indication may be obviated.

Figure 1:
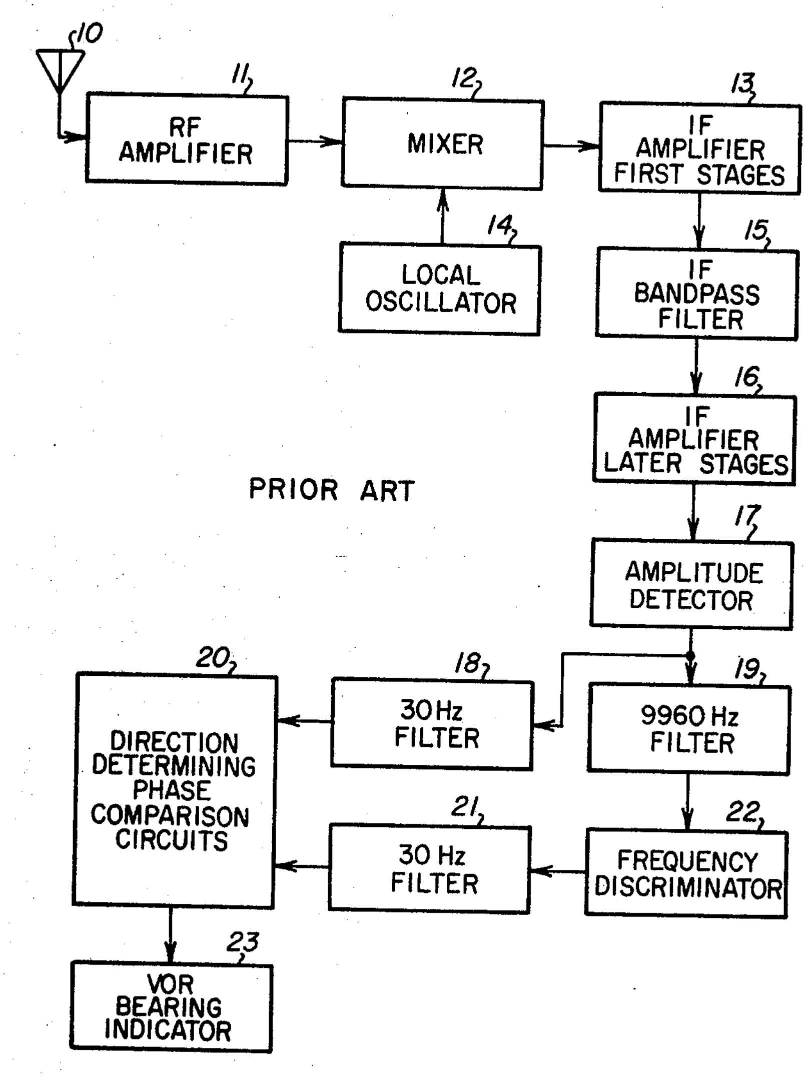
FIG. 1 is a functional block diagram of a conventional VOR receiver.

FIG. 1 is a functional block diagram of a conventional VOR receiver. The received signal is picked up by antenna 10, amplified by RF amplifier 11, and converted to an intermediate frequency by mixer 12 and local oscillator 14. The resulting intermediate frequency from mixer 12 may be amplified, as illustrated, by first stages of IF amplification 13 before being applied through the receiver selectivity determining IF bandpass filter 15. After passing through the selectivity determining bandpass filter 15, the signal may be further amplified by the later stages of IF amplification 16 before being applied to amplitude detector 17. Amplitude detector 17 provides an output signal comprised of the 30 Hz amplitude modulation of the carrier frequency and the 9960 Hz subcarrier which is in turn frequency modulated at the 30 Hz rate. The output from amplitude detector 17 is applied to a 30 Hz filter 18 and to a 9960 Hz filter 19 to separate the 30 Hz amplitude modulation signal from the other components of the demodulated AM signal. A 9960 Hz filter 19 separates the 9960 Hz subcarrier from the other components of the demodulated AM signal. The output from 9960 Hz filter 19 is applied to a frequency discriminator 22 which demodulates the 30 Hz FM modulation of the 9960 Hz subcarrier. The output of frequency discriminator 22 is passed through a further 30 Hz filter 21 to provide the second of two 30 Hz signals the relative phase between which is conventionally indicative of the relative bearing between the transmitting station and the receiving location. The outputs from the two 30 Hz filters 18 and 21 are applied to a direction determining phase comparison circuitry 20 the output of which is applied to a VOR bearing indicator 23.

As above discussed, should modulation components from an adjacent channel be detected by amplitude detector 17, false VOR bearing indications may result. For example, should a 9960 Hz subcarrier component from an adjacent channel lie on the slope or skirt of the IF bandpass filter 15, slope detection results and the resulting FM to AM conversion due to the slope detection results in a further 30 Hz component the phase of which is dependent upon the frequency deviation of the frequency modulated 9960 Hz subcarrier. This component, as well as the normal or desired 30 Hz component, is passed through filter 18 with an erroneous phase for subsequent comparison to the 30 Hz signal carried by the frequency modulation of the subcarrier. The relative phase between the two 30 Hz signals applied to phase comparator 20 is, therefore, not truly indicative of the actual relative bearing and the bearing indication on indicator 23 may be erroneous.

Figure 2:
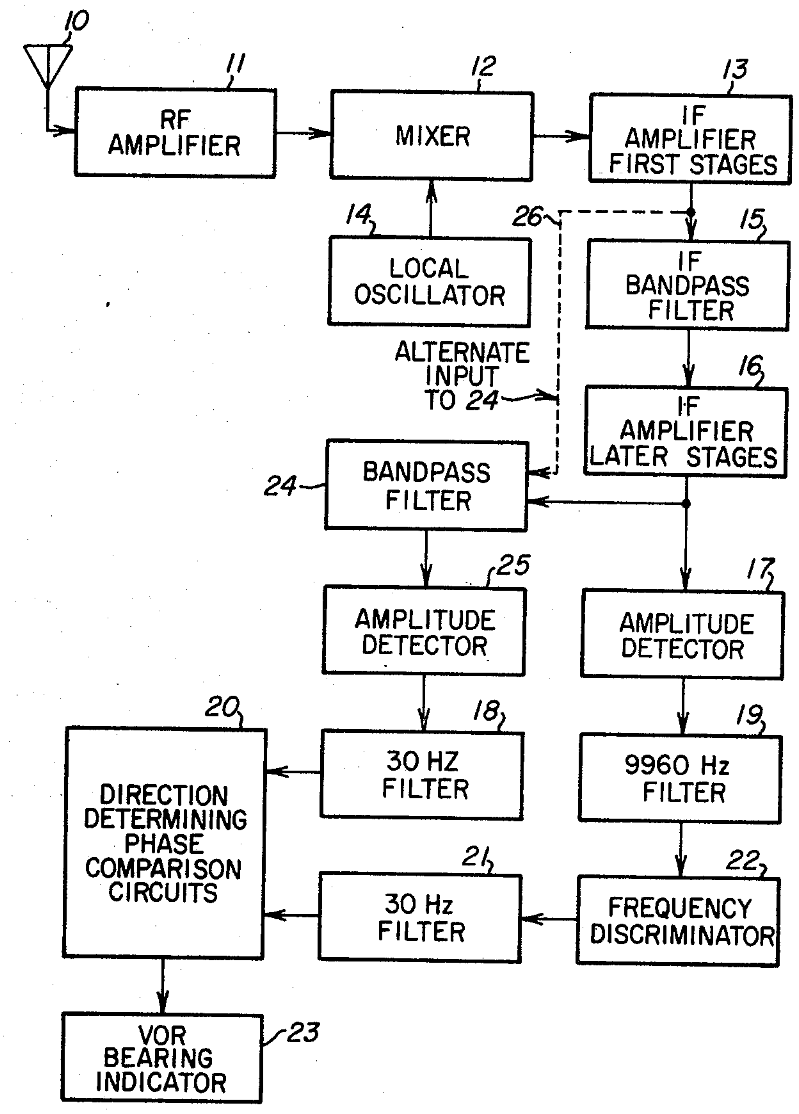
FIG. 2 is a functional diagram of a conventional VOR receiver modified in accordance with the present invention.

FIG. 2 is a block diagram of a VOR receiver modified in accordance with the present invention to avoid the false direction indication problem which results from FM to AM conversion of one of the 9960 Hz modulation sidebands which may fall on the skirts of IF bandpass filter 15. It may be noticed that FIG. 2 is identical to the conventional circuitry depicted in FIG. 1 with the exception that a bandpass filter 24 and amplitude detector 25 are added to separably detect the 30 Hz amplitude modulation of the received carrier. The output from the later stages of IF amplification 16 is applied as input to the further bandpass filter 24 which in accordance with the present invention would be selected to have a passband narrower than that of the receiver selectivity determining bandpass filter 15. Filter 24 may have a bandpass significantly narrower than that of IF bandpass filter 15 since in the embodiment of FIG. 2 filter 24 is not required to pass the modulation sidebands of the 9960 Hz subcarrier but is only used for the 30 Hz AM modulation. With this arrangement any amplitude modulation signal resulting from FM to AM conversion on the skirts of IF bandpass filter 15 occurs outside the passband of the narrower bandpass filter 24. Therefore, the signal demodulated by amplitude detector 25 contains only the desired AM components of the carrier signal (if the carrier is within the passband of bandpass filter 24, which will never be true for an adjacent channel signal) and the undesired AM components on the 9960 Hz sideband resulting from FM to AM conversion will not reach amplitude detector 25. With this receiving system the only AM components passing 30 Hz bandpass filter 18 are those resulting from the 30 Hz amplitude modulation of the desired carrier frequency. All other 30 Hz amplitude modulation components will have been eliminated by bandpass filter 24. Therefore, the direction determining phase comparison circuitry 20 will only receive the desired 30 Hz signal from 30 Hz filter 18 and cannot be disturbed by the signals resulting from unwanted FM to AM conversion of the 9960 Hz subcarrier sidebands of adjacent channel signals which may fall on the skirts of IF bandpass filter 15.

The improved receiver of the present invention has been described on the basis of an arbitrarily shown inclusion of IF bandpass filter 15 in the middle of the IF amplifier of the receiver, the latter being collectively represented by blocks 13, 15, and 16. Under certain circumstances it might be preferable to place the bandpass filter 15 immediately following mixer 12 while under other circumstances it might be preferable to place the IF bandpass filter 15 immediately preceding amplitude detector 17. Any of the design choices of this type do not alter the basic improved receiver concept as discussed above. The input to bandpass filter 24 in FIG. 2 is illustrated as being a signal which has already been passed through IF bandpass filter 15. It is obvious that a parallel path (alternate path 25 as indicated in dash lines in FIG. 2) starting at the input of filter 15, would be equally effective.

A major factor to be considered in these design alternatives, in stating that it makes no difference whether the signal passing bandpass filter 24 has previously passed filter 15, as far as the effect of FM to AM conversion on the skirts of filter 15 is concerned, is that filter 15 be a linear filter which only alters the amplitude and phase of spectrum components which already exist and creates no new components. Therefore, bandpass filter 24 may be designed to eliminate unwanted components whether it is placed in tandem with IF bandpass filter 15 or whether it is placed in a parallel path.

The present invention is thus seen to provide an improvement in conventional VOR receivers by means of which the receiver may be rendered immune to false VOR bearing indications stemming from adjacent channel modulation components.

Although the present invention has been described with respect to a particular embodiment thereof, it is not to be so limited as changes might be made therein which fall within the scope of the invention as defined in the appended claims.

I claim:

1. In a radio receiver of the type receiving a selected one of a plurality of carrier wave frequencies having one of a plurality of frequency allocations in equally spaced channels, said receiver comprising means to convert said received carrier to an intermediate frequency, intermediate frequency amplifying means including a first bandpass filter means the center frequency of which corresponds nominally to said intermediate frequency, said carrier wave being amplitude modulated at a predetermined tonal rate and being further amplitude modulated at a subcarrier frequency rate with said subcarrier being frequency modulated at said tonal rate with a predetermined frequency deviation; means for detecting said carrier wave modulation components to the exclusion of those emanating from an adjacent channel comprising a first amplitude modulation detector receiving said intermediate frequency signal as applied through said first bandpass filter means, frequency discriminator means receiving the output from said first amplitude modulation detector and producing said tonal rate frequency modulation component, a first tonal rate filter receiving the output from said frequency discriminating means, a further bandpass filter receiving said intermediate frequency signal, said further bandpass filter having a passband sufficiently narrow to exclude said subcarrier modulation components and harmonics thereof while passing said carrier tonal rate amplitude modulation components, a further amplitude modulation detector receiving the output of said further bandpass filter, a second tonal rate filter receiving the output of said further amplitude modulation detector and producing said carrier tonal rate amplitude modulation component; phase comparison means receiving the outputs from said first and second tonal rate filters, and indicating means responsive to the output of said phase comparison means to indicate the relative bearing between the transmission source of said received carrier frequency and said receiver.

2. A radio receiving means as defined in claim 1 wherein said first IF bandpass filter means has a bandwidth sufficiently wide to pass all modulation components of said intermediate frequency amplifier signal and said further bandpass filtering means has a passband sufficiently wide to pass said tonal rate amplitude modulation components of said carrier signal as they appear in said intermediate frequency signal and to exclude said subcarrier and subcarrier frequency modulation components as they appear in said intermediate frequency signal.

3. A radio receiving means as defined in claim 2 wherein said further bandpass filter is connected to receive said intermediate frequency signal after said intermediate frequency signal has passed through said first bandpass filter means.

4. A radio receiving means as defined in claim 2 wherein said further bandpass filter is connected to receive said intermediate frequency signal prior to application of said intermediate frequency signal to said first bandpass filter means.

5. In a radio receiver of the type receiving a selected one of a plurality of carrier wave frequencies having one of a plurality of frequency allocations in equally spaced channels, said receiver comprising means to convert said received carrier to an intermediate frequency, intermediate frequency amplifying means including a first bandpass filter means the center frequency of which corresponds nominally to said intermediate frequency, said carrier wave being amplitude modulated at a predetermined tonal rate and being further amplitude modulated at a subcarrier frequency rate with said subcarrier being frequency modulated at said tonal rate with a predetermined frequency deviation; means for detecting said carrier wave modulation components to the exclusion of those emanating from an adjacent channel comprising first and second modulation component detection means, said intermediate frequency signal being applied as input to each of said first and second modulation detection means, said first modulation detection means including frequency selective means to effect selective detection of said tonal rate amplitude modulation frequency component to the exclusion of said subcarrier frequency modulation components, said second modulation component detection means comprising frequency selective means to effect selective detection of said tonal rate frequency modulation component of said intermediate frequency signal to the exclusion of said tonal rate amplitude modulation components, phase comparison means receiving the tonal rate modulation component outputs from each of said first and second modulation component detection means, and indicating means responsive to the output of said phase comparison means to indicate the relative bearing between the transmission source of said received carrier frequency and said receiver.

6. Means as defined in claim 5 wherein said first modulation component detection means comprises a further bandpass filter to which said intermediate frequency signal is applied, said further bandpass filter having a passband effecting passage of said tonal rate carrier amplitude modulation component to the exclusion of said subcarrier frequency modulation components, a first amplitude modulation detector receiving the output from said further bandpass filter, a first tonal rate filter receiving the output from said first amplitude detector, and the output from said first tonal rate filter comprising said output from said first modulation component detection means.

7. Means as defined in claim 6 wherein said second modulation component detection means comprises a second amplitude detector receiving said intermediate frequency signal, a subcarrier bandpass filter receiving the output from said second amplitude detector, a frequency discriminator receiving the output from said subcarrier filter, and a second tonal rate filter receiving the output from said frequency discriminator, the output from said second tonal rate filter comprising said output from said second amplitude modulation component detection means.

8. Means as defined in claim 7 wherein said intermediate frequency signal is applied to said second modulation component detection means after passing through said first bandpass filter means, said first modulation component detection means being connected to receive said intermediate frequency signal after said intermediate frequency signal has passed through said first bandpass filter means.

9. Means as defined in claim 7 wherein said intermediate frequency signal is applied to said second modulation component detection means after passing through said first bandpass filter means, said first modulation component detection means being connected to receive said intermediate frequency signal prior to application of said intermediate frequency signal to said first bandpass filter means.

* * * * *